United States Patent [19]
Kompan

[11] 3,982,299
[45] Sept. 28, 1976

[54] MEAT CUTTER

[75] Inventor: Louis Kompan, Kitchener, Canada

[73] Assignee: Burns Foods Limited, Kitchener, Canada

[22] Filed: May 1, 1975

[21] Appl. No.: 573,728

[52] U.S. Cl. .......................................... 17/1 R; 17/23
[51] Int. Cl.² .................................................. A22B 5/20
[58] Field of Search ................. 17/1 R, 1 G, 23, 52, 17/46, 24, 56; 83/4, 368

[56] References Cited
UNITED STATES PATENTS

| 2,962,752 | 12/1960 | Massengill | 17/1 G |
| 3,546,737 | 4/1968 | Neebel et al. | 17/1 R |
| 3,771,196 | 11/1973 | Doerfer et al. | 17/1 R |
| 3,849,836 | 11/1974 | Bernard et al. | 17/1 R |

FOREIGN PATENTS OR APPLICATIONS

| 693,728 | 9/1964 | Canada | 17/1 R |

Primary Examiner—Louis G. Mancene
Assistant Examiner—James D. Hamilton
Attorney, Agent, or Firm—Fetherstonhaugh & Co.

[57] ABSTRACT

A meat cutter for removing the backbone of a pork loin consisting of a conveyor apparatus and a cutter assembly for cutting the backbone portion from a pork loin as the pork loin is moved through a cutting station. The cutter assembly consists of a cutter head mounted for movement towards and away from the conveyor. The cutter head is biased for movement towards a predetermined plane disposed above the conveyor and has a leading end disposed in a direction opposite to the direction of travel of the conveyor through the cutting station. A cutter blade is mounted on a head for movement in a cutting path that extends transversely across and is spaced above the conveyor. A guide shoe is mounted on the head and located at the leading end of the head to be elevated by engagement with an advancing pork loin to elevate the head to locate the cutting portion of the cutter blade at a predetermined level below the plane of the upper surface of the backbone of the pork loin to cut the backbone from the loin at a uniform depth below the upper surface along the full length of the loin as the loin is driven through the cutting station.

5 Claims, 10 Drawing Figures

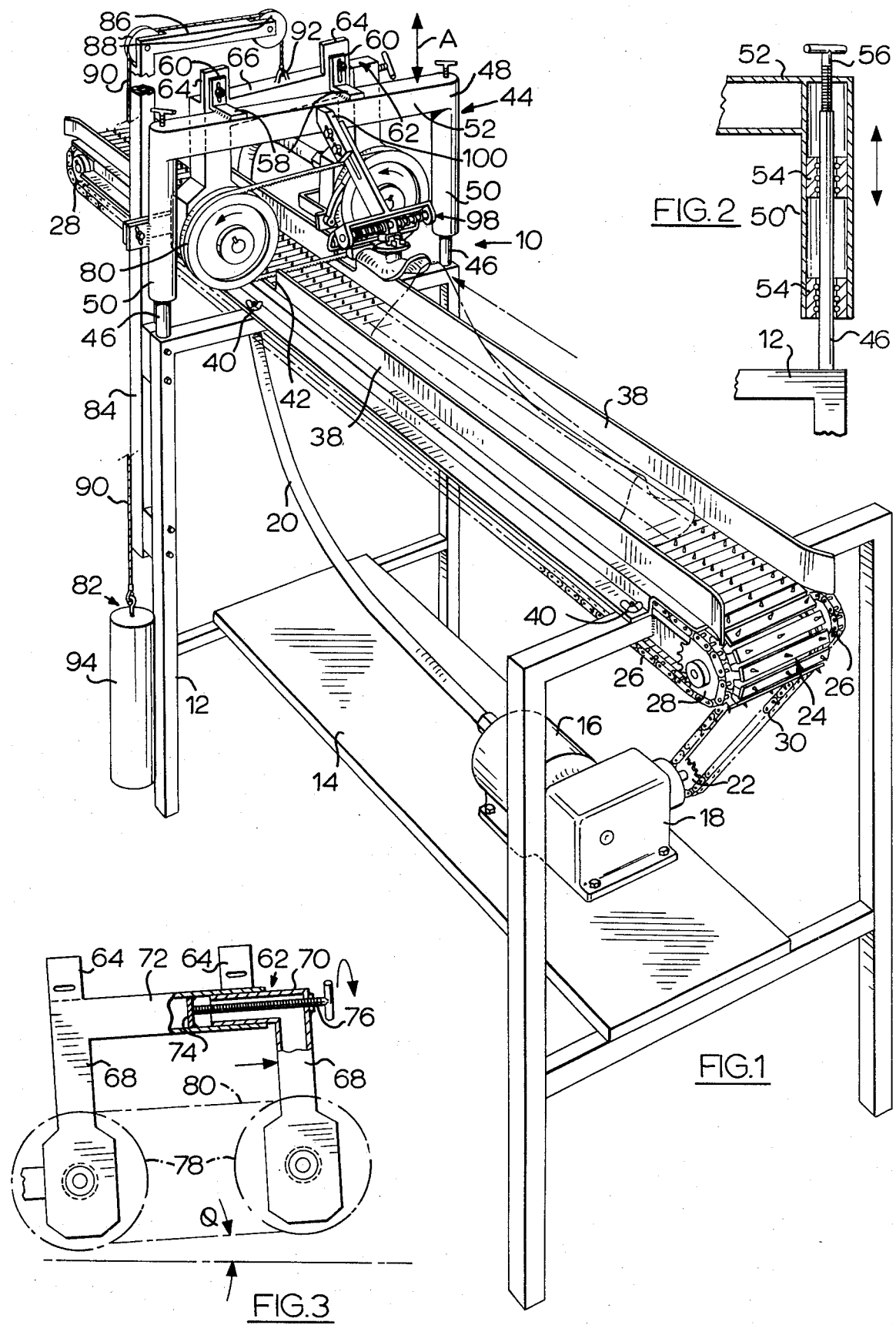

MEAT CUTTER

FIELD OF INVENTION

This invention relates to a device for removing at least a portion of the backbone from a pork loin.

PRIOR ART

In the dressing of pork loins, the removal of the backbone from the loin has been a manual operation. This operation has been a time-consuming operation which presents a bottleneck in the meat dressing operation. The backbone is presently removed by an operator using a hand-held power saw. The operator merely guides the saw along the backbone. Because of the manual nature of the operation, it is time-consuming and costly in man hours. Furthermore, the manual operation is subject to the operator's skill and examination of the trimmings indicates that excessive amounts of meat are frequently removed from the loin. Difficulty has been experienced in attempting to make the backbone removal operation a mechanical operation due to the extensive variations in the size and proportions of the loins from which the backbone is to be removed. Generally, however, the proportions of the backbone itself are fairly uniform in the various classes of loins which are being trimmed.

As indicated above, the known manual method of removing the backbone from the pork loin is slow and, therefore, reduces the overall speed of operation of the trimming process. Furthermore, the manual method is costly in man hours and in respect of the excessive amount of meat which is removed.

The present invention overcomes the above difficulties and provides a meat cutting device which is automatic and which will remove a uniform portion from each loin which is driven through the cutting station.

According to one aspect of the present invention, there is provided a meat cutter for removing the backbone from a pork loin which comprises a conveyor assembly adapted to move a loin of pork through a cutting station with the backbone portion of the loin upwardly disposed and extending longitudinally of the conveyor, a cutter assembly in the cutting station and disposed above the conveyor, the cutter assembly comprising a cutter head mounted for movement towards and away from said conveyor, said head having a leading end disposed in a direction opposite to the direction of travel of the conveyor through the station, means for biasing the head towards a predetermined level above the conveyor, a cutter blade mounted on the head for movement in a cutting plane extending transversely across and spaced above the conveyor, a guide shoe mounted on said head and located at the leading end of the head to be elevated by engagement with an advancing pork loin to elevate the head to rotate the cutting portion of the blade at a predetermined level above the surface of the backbone of the loin to cut the backbone from the loin at a uniform depth below said upper surface along the full length of the loin as it is driven through the cutting station.

According to a further aspect of the invention, the guide shoe is mounted so as to be laterally, angularly and longitudinally self-aligning with respect to the backbone of loin passing through the cutting station so as to regulate the depth of cut.

PREFERRED EMBODIMENT

The invention will be more clearly understood after reference to the following detailed specification read in conjunction with the drawings wherein:

FIG. 1 is a pictorial front view of a meat cutter according to an embodiment of the present invention;

FIG. 2 is an enlarged fragmentary sectional view of a portion of the head of the cutter of FIG. 1;

FIG. 3 is a partially sectioned side view of a portion of the head of the cutter of FIG. 1;

Figure 4:
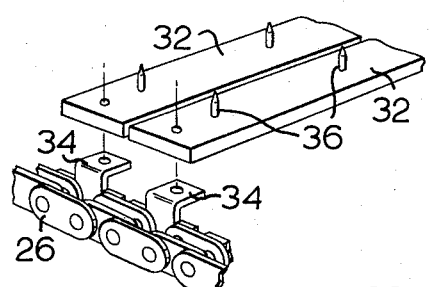
FIG. 4 is a fragmentary view of a portion of the conveyor.

With reference to the drawings, the reference numeral 10 refers generally to a meat cutter machine according to an embodiment of the present invention. The machine consists of a tubular frame generally identified by the reference numeral 12. The frame 12 supports a base plate 14 upon which a drive motor 16 and reduction gear 18 are mounted. Drive motor 16 has a flexible drive cable 20 extending from one end thereof and the reduction gear 18 has a drive sprocket 22 rotatably driven thereby. An endless conveyor generally identified by the reference numeral 24 is mounted for movement longitudinally of the frame. The conveyor 24 consists of a pair of endless chains 26 which extend about sprockets 28 mounted at opposite ends of the frame 12. The shaft on which the sprockets 28 are mounted at one end of the conveyor is driven by a chain 30 which in turn is driven by the sprocket 22. As shown in FIG. 4 of the drawings, the conveyor consists of a plurality of plates 32 which are secured to lugs 34 carried by the chains 26. Each of the plates 32 has a plurality of short spikes 36 projecting upwardly from the upper surface thereof. The spikes project into the meat and help to prevent the meat from slipping with respect to the conveyor as the conveyor is driven through the cutting station. A pair of oppositely disposed side wall members 38 are mounted on the frame by means of wing nuts and associated locking pins 40. The side plates 38 serve to prevent lateral displacement of the pork loin during the cutting operation. It will be noted that the side walls 38 extend in advance of and beyond the cutting station and are notched at 42 to permit the cutting blade to extend to a level below the upper edges of the side walls.

The cutting head generally identified by the reference numeral 44 is located towards one end of the frame and is slidably mounted on posts 46 which project upwardly from the frame 12.

The head 44 consists of a U-shaped portion 48 which includes a pair of vertically oriented tall tubular members 50 and a transverse member 52. As shown in FIG. 2 of the drawings, bearings 54 are located in the tubular members 50 to slidably receive the posts 46. A stop screw 56 is threaded in the closed upper end of the tubular member 50 and serves to adjustably limit the lowermost position of the U-shaped frame with respect to the posts 46.

A pair of angle brackets 58 are welded to the upper face of the transverse member 52. The vertically oriented portion of the angle brackets 58 have a slot 60 extending longitudinally thereof. A second generally U-shaped frame component 62 has a pair of lugs 64 projecting upwardly from the transverse member 66 thereof in alignment with the brackets 58. The lugs 64 are releasably secured with respect to brackets 58 by bolts extending through elongated passages 60. The second frame component 62 is movable with respect to the first frame component by adjustment of the positions of the lugs 64 with respect to the brackets 58.

FIG. 3 of the drawings clearly illustrates the structure of the second frame component 62. The frame consists of a pair of leg members 68 which extend downwardly from transverse members 70 and 72. The transverse member 70 is telescoped within the transverse member 72. A stop plate 74 is secured within the transverse member 72 and an adjustment screw 76 is threaded in the frame in a position to extend into engagement with the stop plate 74. Rotation of the adjustment screw 76 in one direction will cause the arms 68 to move away from one another to apply an increased tension to the cutter blade and rotation in the opposite direction will permit the arms 66 to move towards one another to facilitate the mounting and removal of the cutter blade. A pair of pulleys 78 are mounted at the lower ends of the arms 68 and one of the pulleys 68 is rotatably driven by the flexible drive 20 from the motor 16 in a conventional manner. The cutter blade 80 which is in the form of a band saw extends around the pulleys 78 and is rotatably driven by the rotation of the driven pulley 78. As previously indicated, tension may be applied to the blade or the blade may be released by rotation of the adjustment screw 76. It is important in the operation of the apparatus of the present invention that the head assembly 44 should rise and fall in the vertical plane in the directions indicated by the arrows A. As previously indicated, the head 44 is mounted to reciprocate vertically on the posts 46. It is important that the head should be capable of being elevated without the application of any great load and to achieve this objective, a counterweight assembly, generally identified by the reference numeral 82, is provided. The assembly consists of an L-shaped post 84 which is rigidly secured with respect to the frame 12 and which has a transverse beam member 86 at the upper end thereof extending above the conveyor 24. Pulleys 88 are mounted at opposite ends of the transverse beam member 86 and a flexible cable 90 is connected at one end to an eye 92 mounted on the transverse beam member 66 of the second component of the head and at the other end to a counterweight 94. The weight of the head assembly including the shoe which will be described hereinafter is slightly greater than the weight of the counterweight so that the head assembly will normally rest in its lowered position wherein the adjustment screws 56 rest on the upper ends of the posts 46. The elevation of the lower run or cutting plane of the cutter blade 80 is controlled by a guide shoe assembly 98. The assembly 98 is mounted on a bracket 100 which projects forwardly from the transverse beam portion 52 of the frame 48.

Figure 5:
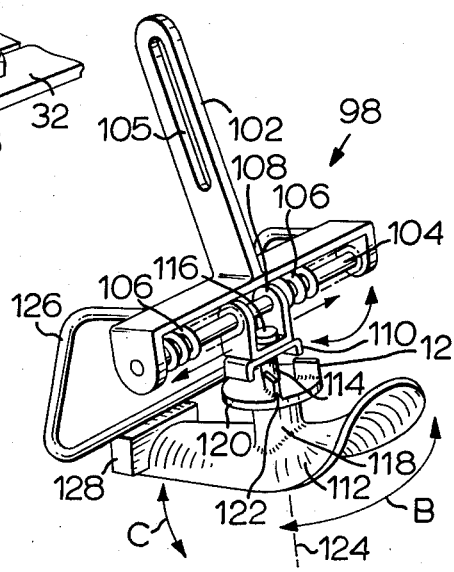
FIG. 5 is a pictorial front view of the guide shoe assembly of FIG. 1.
Figure 6:
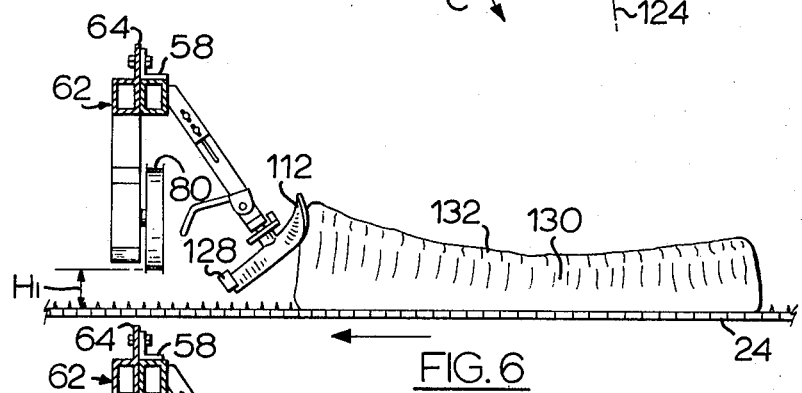
FIG. 6 is a side view illustrating the first position of the cutter head assembly in the operation of the assembly.

As shown in FIG. 5 of the drawings, shoe assembly 98 consists of a Y-shaped bracket 102 which has a transverse bar 104 extending between the spaced ends thereof. An elongated opening 106 is formed in the leg of the Y-shaped bracket 102. A U-shaped bracket 108 is slidably mounted on the transverse bar 104 with spring members 106 located between the opposite sides of the bracket 108 and the ends of the bracket 102. The spring members 106 serve to center the bracket 108 with respect to the bracket 102. An inverted U-shaped bracket 110 extends downwardly from the bracket 108 and the downwardly extending arms of the bracket 110 act as stops for limiting the rotation of the shoe member 112 as will be described hereinafter. A pivot pin 114 extends downwardly from the bracket 110 and has its head portion 116 resting against the lower end of the bracket 108. The pivot pin 114 is rotatable about its longitudinal axis. The lower end of the pivot pin 114 is secured with respect to the leg 118 of the shoe 112. A disc is located at the upper end of the leg 118 and is secured thereto. The disc 120 has a pair of lugs 122 projecting upwardly therefrom. The lugs 122 cooperate with the downwardly directed arms of the bracket 110 to limit the angular displacement of the shoe 112 in the direction of the arrows B about the axis 124. The shoe 112 is pivotable about the axis of the shaft 104 in the direction of the arrows C. The movement of the shoe in the direction of the arrow C is limited by a stop bar 126 which is secured at one end to the transverse portion of the Y-shaped bracket 120 and which has an outer end which overlies the weight block 128 which is located at the trailing end of the shoe 112. The weight block 128 serves to bias the shoe to the position in which the front end thereof is elevated as shown in FIG. 6 of the drawings. The underside of the shoe has a shallow concave curvature over the full length of the shoe and the front end of the shoe is upwardly flared to facilitate the alignment of the shoe with the pork loin which is to be cut.

Figure 7:
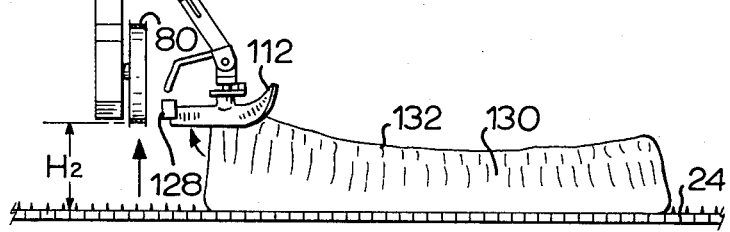
FIG. 7 is a view similar to FIG. 6 showing a second position of the cutter head assembly.
Figure 7A:
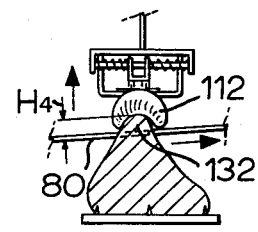
FIG. 7a is an end view of the assembly of FIG. 7.
Figure 8:
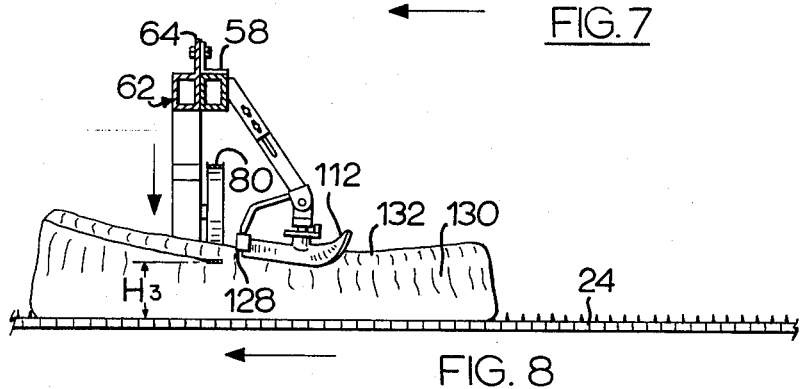
FIG. 8 is a side view similar to FIGS. 6 and 7 showing a further position of the cutter assembly.
Figure 8A:
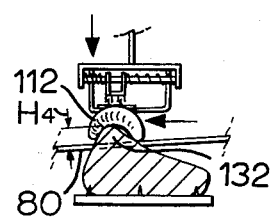
FIG. 8a is an end view showing the cutter head assembly in the position illustrated in FIG. 8.

In use, the transverse angle of inclination of the saw blade is preset to the required angle of inclination (FIG. 3) which is normally about 5° to the horizontal. The motor 16 is started to drive the cutter blade 80 and the conveyor assembly 24. A pork loin 130 is located on the conveyor 24 as shown in FIG. 6 of the drawings and advanced by the conveyor into engagement with the shoe 128. The pork loin is disposed so that the backbone ridge is upwardly directed. Before the shoe 112 engages the loin 130, the height of the cutting extend of the blade 80 above the conveyor 24 is H1 which is less than the minimum height required during the cutting operation. When the leading end of the shoe 112 engages the loin, the shoe 112 is elevated to the position shown in FIG. 7 wherein the blade 80 is located at the height H2 which is substantially higher than the height H1. If the backbone ridge of the loin is not centrally located with respect to the conveyor, the shoe 112 will be laterally displaced to follow the backbone ridge by compression of one or other of the springs 106. The shoe will rotate about the axis 102 of the pin 116 in order to follow the lateral curvature of the backbone ridge. The shoe 112 will follow the vertical longitudinal curvature of the backbone ridge by pivoting about the axis of the shaft 104. The depth of the cut which is made in the loin is controlled by the distance between the blade 80 and the upper surface of the concave curvature of the shoe 112. As shown in FIGS. 7a and 8a of the drawings, this is the height H4 which is substantially constant. FIG. 8a of the drawings serves to illustrate the manner in which the shoe 112 is laterally displaced by compression of the spring 106 in following the curvature of the backbone ridge 132.

From the foregoing it will be apparent that the shoe assembly acts as a guide for raising and lowering the level of the cutting plane of the cutter blade with respect to the conveyor. The shoe is mounted on the head of the cutter so as to be capable of the following the vertical, lateral and longitudinal curvature of the backbone rib of the pork loin to permit the backbone to be removed without the removal of excess meat. The self-aligning characteristics of the shoe are such that the only manual operation required is the location of the loin on the conveyor with the backbone ridge upwardly directed. With this apparatus, it is possible to increase the speed of operation of the removal of the backbone from the loin to a point where this operation no longer constitutes a bottleneck in the meat dressing process. The cost of the operation is substantially reduced by the reduction in man hours required as it will be apparent that in the production line, an operator can operate more than one of these machines so that the labour costs involved in the operation are substantially reduced. By reason of the fact that a uniform cut is made in each loin, there is less waste of meat and this again serves to reduce the cost of the dressing operation. The operation also serves to provide a more uniform dressed appearance which is more acceptable to the purchasing public.

These and other advantages of the apparatus of the present invention will be apparent to those skilled in the art.

What I claim as my invention is:

1. A device for removing the backbone from a loin of pork comprising,
   a. a conveyor assembly adapted to move a loin of pork through a cutting station with the backbone portion of the loin upwardly disposed and extending longitudinally of the conveyor,
   b. a cutter assembly in said cutting station and disposed above said conveyor comprising,
      i. a cutter head mounted for movement upward away from and downwardly towards a predetermined plane disposed above said conveyor, said head being biased for movement downwardly towards said predetermined plane, said head having a leading end disposed in a direction opposite to the direction of travel of the conveyor through said cutting station,
      ii. a saw blade mounted on said head for movement in a cutting plane extending transversely across and spaced above said conveyor,
      iii. a guide shoe having a longitudinally elongated underside formed with a transverse concave curvature of sufficient depth to cause the underside to bear against the top and sides of the upwardly directed backbone ridge of a pork loin passing through said cutting station,
      iv. support means projecting forwardly from said cutter head for supporting said shoe in advance of said cutter head such that the vertical movement of the shoe results in a vertical movement of the head,
      v. mounting means connecting said shoe to said support means to permit movement of said shoe means in a direction transverse to the path of travel of the conveyor and about a vertical and a horizontal axis whereby the shoe may move to follow the longitudinally transverse curvature of the backbone and the longitudinally vertical curvature of the backbone to cause the cutter head and thereby the saw blade to be raised and lowered to follow the longitudinal vertical curvature of the backbone to provide a cut of uniform depth along the full length of the loin as it is driven through the cutting station.

2. A meat cutter as claimed in claim 1 wherein said head is angularly adjustable to adjust the angle of the cutting plane with respect to the conveyor.

3. A meat cutter as claimed in claim 1 wherein said guide shoe is weighted to elevate the leading end thereof.

4. A meat cutter as claimed in claim 1 wherein said conveyor assembly includes an endless conveyor means and a pair of oppositely disposed side walls extending in advance of and rearwardly from said cutting station.

5. A device as claimed in claim 1 wherein said mounting means includes,
   i. a transverse support shaft having a longitudinal axis extending transversely of said path of travel of the conveyor, said longitudinal axis being disposed in a horizontal plane,
   ii. a slide member mounted on said transverse support shaft for pivotal movement about said longitudinal axis of said shaft and for movement along said shaft in the transverse direction with respect to the conveyor,
   iii. resilient means associated with said shaft for centering said slide member with respect to the length of said shaft,
   iv. vertically oriented pivot means connecting said shoe to said slide to permit limited rotational movement of said shoe about a vertical axis, such that said slide member permits transverse movement of said shoe along said support shaft and rotational movement of said shoe in an arc about the axis of said support shaft and rotational movement of said shoe in an arc about said vertical axis whereby the shoe may follow the backbone of the loin as aforesaid.

* * * * *